(12) United States Patent
Hoffmann

(10) Patent No.: US 7,631,932 B2
(45) Date of Patent: Dec. 15, 2009

(54) HORIZONTALLY ADJUSTABLE MOTOR-VEHICLE HEADREST

(75) Inventor: Markus Hoffmann, Kümmersbruck (DE)

(73) Assignee: Grammer AG, Amberg (DE)

( * ) Notice: Subject to any disclaimer, the term of this patent is extended or adjusted under 35 U.S.C. 154(b) by 290 days.

(21) Appl. No.: 11/296,577

(22) Filed: Dec. 7, 2005

(65) Prior Publication Data

US 2006/0119150 A1 Jun. 8, 2006

(30) Foreign Application Priority Data

Dec. 8, 2004 (DE) .................. 10 2004 059 237

(51) Int. Cl.
*B60N 2/48* (2006.01)
(52) U.S. Cl. ............... 297/216.12; 297/407; 297/406
(58) Field of Classification Search ............ 297/216.12, 297/391, 406, 407, 284.8
See application file for complete search history.

(56) References Cited

U.S. PATENT DOCUMENTS

| 4,278,291 | A | | 7/1981 | Asai | |
| 4,515,406 | A | * | 5/1985 | Fujiyama et al. | 297/409 |
| 4,540,217 | A | * | 9/1985 | Suzuki | 297/391 |
| 4,778,218 | A | * | 10/1988 | Suman | 297/391 |
| 4,856,848 | A | * | 8/1989 | O'Sullivan et al. | 297/391 |
| 6,019,424 | A | * | 2/2000 | Ruckert et al. | 297/216.12 |
| 6,213,548 | B1 | * | 4/2001 | Van Wynsberghe et al. | 297/216.12 |
| 6,520,585 | B1 | * | 2/2003 | Georg et al. | 297/408 |
| 6,688,697 | B2 | * | 2/2004 | Baumann et al. | 297/391 |
| 6,715,829 | B2 | * | 4/2004 | Svantesson et al. | 297/216.12 |
| 7,073,863 | B1 | * | 7/2006 | Low et al. | 297/404 |

FOREIGN PATENT DOCUMENTS

| DE | 31 09 592 | 10/1982 |
| DE | 39 00 495 | 7/1990 |
| DE | 3900495 A1 * | 7/1990 |
| EP | 0 974 484 | 1/2000 |

* cited by examiner

*Primary Examiner*—Joseph F Edell
(74) *Attorney, Agent, or Firm*—Andrew Wilford

(57) ABSTRACT

A vehicle headrest has a vehicle-mounted support, a cushion, and guides mounting the headrest cushion on the support for displacement forward from a rear position in a vehicle travel direction and rearward opposite thereto to a front position. A lever pivoted in the cushion has an arm engaging rearward on the support. An actuator connected to the lever can pivot the lever and displace the cushion forward into the front position. The arm has an outer end bearing on but not coupled to the support.

18 Claims, 9 Drawing Sheets

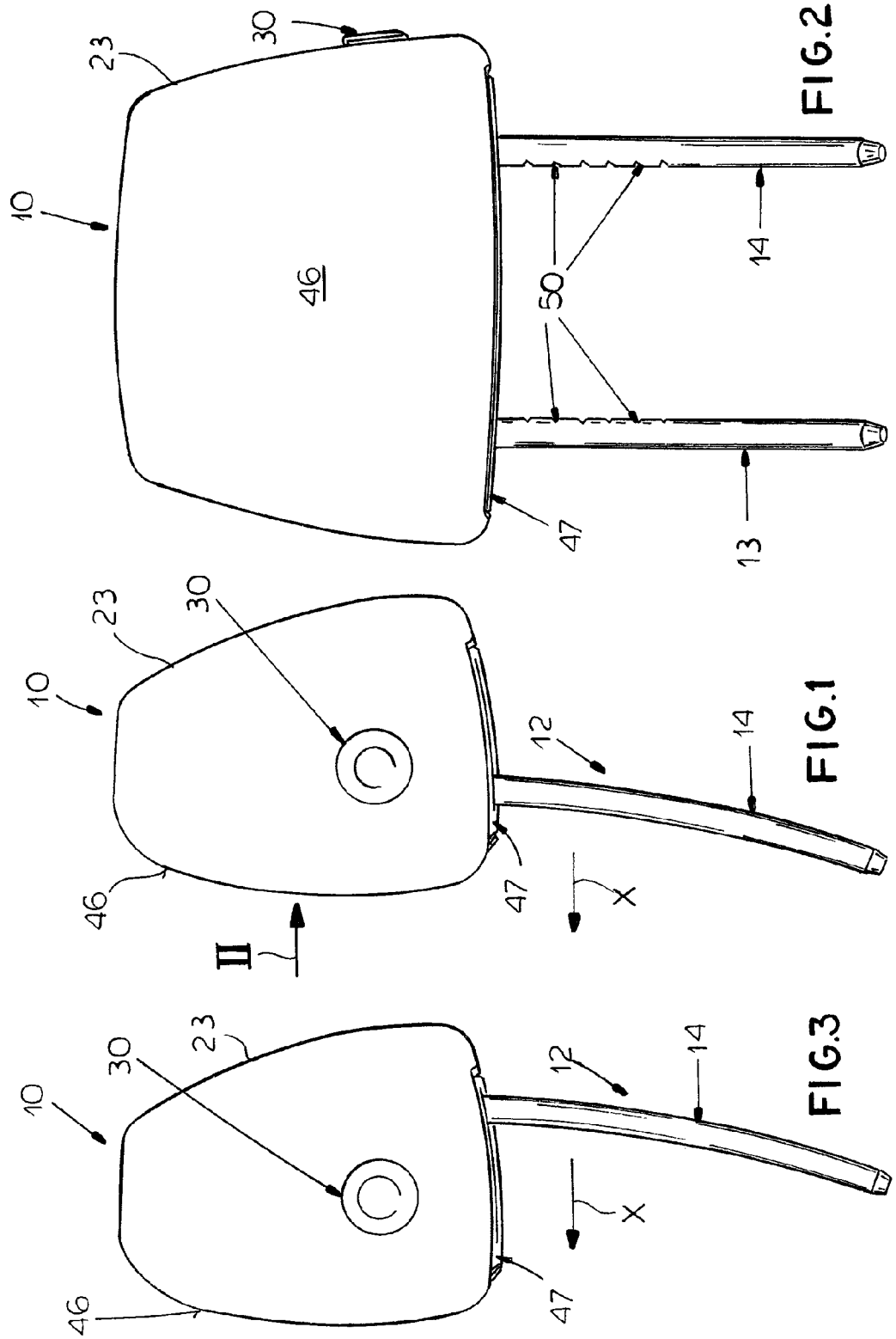

US 7,631,932 B2

HORIZONTALLY ADJUSTABLE MOTOR-VEHICLE HEADREST

FIELD OF THE INVENTION

The present invention relates to a motor-vehicle headrest. More particularly this invention concerns such a headrest that is horizontally adjustable, normally in and against the vehicle travel direction.

BACKGROUND OF THE INVENTION

A vehicle headrest, typically provided in a car or truck, is known having a vehicle-mounted support typically fixed in a seat back and a cushion against which the occupant of the seat can rest the back of his or her head. This headrest provided some protection against whiplash by preventing the occupant's head from snapping too far back when rebounding after a front-end collision or simply moving back in a rear-end collision.

Some adjustability in the vehicle travel direction can be provided as shown in German 3,900,495 or EP 0,974,484 by allowing a portion of the headrest to be shifted forward and rearward. Alternately as described in German 3,109,592 it is possible to provide structure allowing the entire cushion to be shifted forward and rearward. U.S. Pat. No. 4,278,291 described a headrest that is biased forward by springs to provide cushioned whiplash protection.

It is also known to provide some sort of mechanism to automatically shift the cushion forward in a collision so as to limit rearward travel of the seat occupant's head, especially in a situation where there is an air bag that might press the seat occupant back with some force. Above-cited German '495 shifts a part of the cushion forward and locks it in place in a collision, and above-cited EP '484 has a complex set of arms that solidly lock the cushion in its front-most position when activated in a collision.

The known such crash-responsive headrests are typically fairly complex. They do not allow the headrest to be easily reset in a middle or rear position after crash actuation. Furthermore the crash-responsive actuating system often has a number of interlinked parts that cannot be counted on to work after having sat, unused for years. Finally the known systems are expensive to manufacture and replace.

OBJECTS OF THE INVENTION

It is therefore an object of the present invention to provide an improved vehicle headrest.

A further object is to provide such a headrest that is of simple and inexpensive construction, yet that can be counted on to respond and function even after not being used for years.

Yet another object is the provision of a motor-vehicle headrest that can be easily reset after crash actuation.

SUMMARY OF THE INVENTION

A vehicle headrest has according to the invention a vehicle-mounted support, a cushion, and guides mounting the headrest cushion on the support for displacement forward from a rear position in a vehicle travel direction and rearward opposite thereto to a front position. A lever pivoted in the cushion has an arm engaging rearward on the support. An actuator connected to the lever can pivot the lever and displace the cushion forward into the front position.

Thus in addition to the standard parts needed for the headrest to be adjustable, that is the support, cushion, and guides, the system of this invention comprises only two further elements, namely the lever and the actuator. Thus a very simple mechanism can provide crash protection at the headrest.

According to the invention the arm has an outer end bearing on but not coupled to the support, further simplifying the structure in that the lever can be positioned wherever there is room in the cushion. This feature is particularly useful when a removable insert body held in the cushion carries the actuator and the lever. In this system the cushion is formed with an outwardly open cavity complementarily receiving the insert body. The cushion includes a plate fitting over the cavity and holding the insert body therein. The cavity is downwardly open. Thus the insert body with the actuator and lever can be pulled down out of the headrest for replacement if the actuator is of the electrically fired chemical type used in an airbag.

The support according to the invention has a flat upright face against which the arm outer end bears and on which the arm outer end slides as the lever pivots. The lever has a horizontal pivot axis generally parallel to the support face and a second arm extending at an angle of less than 180° to the first-mentioned arm and having an outer end connected to the actuator. This second arm is normally shorter than the first arm, for a mechanical advantage in that a short movement of the actuator will create a large movement of the support-engaging long arm. In this manner the actuator can expand parallel to the travel direction to push back the support and shift the cushion forward, a system that is kinematically very simple.

The actuator in accordance with the invention is a piston-cylinder unit having one end pivoted on the cushion and an opposite end pivoted on the second-arm outer end. The ends of the piston-cylinder unit are pivoted at axes substantially parallel to the support front face. This piston cylinder unit has a piston rod pivoted on the second-arm outer end and a cylinder pivoted on the cushion. It is fluid powered, preferably gas powered.

The headrest further has according to the invention a rod adapted to be fixed in a vehicle seat back and carrying the support. It is provided with or connected to a sensor responsive to sudden crash-type deceleration for operating the actuator.

In accordance with the invention a latch connected between the cushion and the support prevents movement of the cushion opposite to the travel direction. This latch includes a toothed element extending in the travel direction and a pawl capable of ratcheting along the toothed element. The toothed element is a rack formed with sawtooth notches and fixed on the cushion and the pawl is pivotal and mounted on the support. The latch includes an externally accessible element operable to disengage the pawl from the rack.

BRIEF DESCRIPTION OF THE DRAWING

The above and other objects, features, and advantages will become more readily apparent from the following description, reference being made to the accompanying drawing in which:

FIG. 1 is a side view of the headrest according to the invention in the rear position;

FIG. 2 is a front view taken in the direction of arrow II of FIG. 1;

FIG. 3 is a view like FIG. 1 with the headrest in the front position;

SPECIFIC DESCRIPTION

Figure 4:
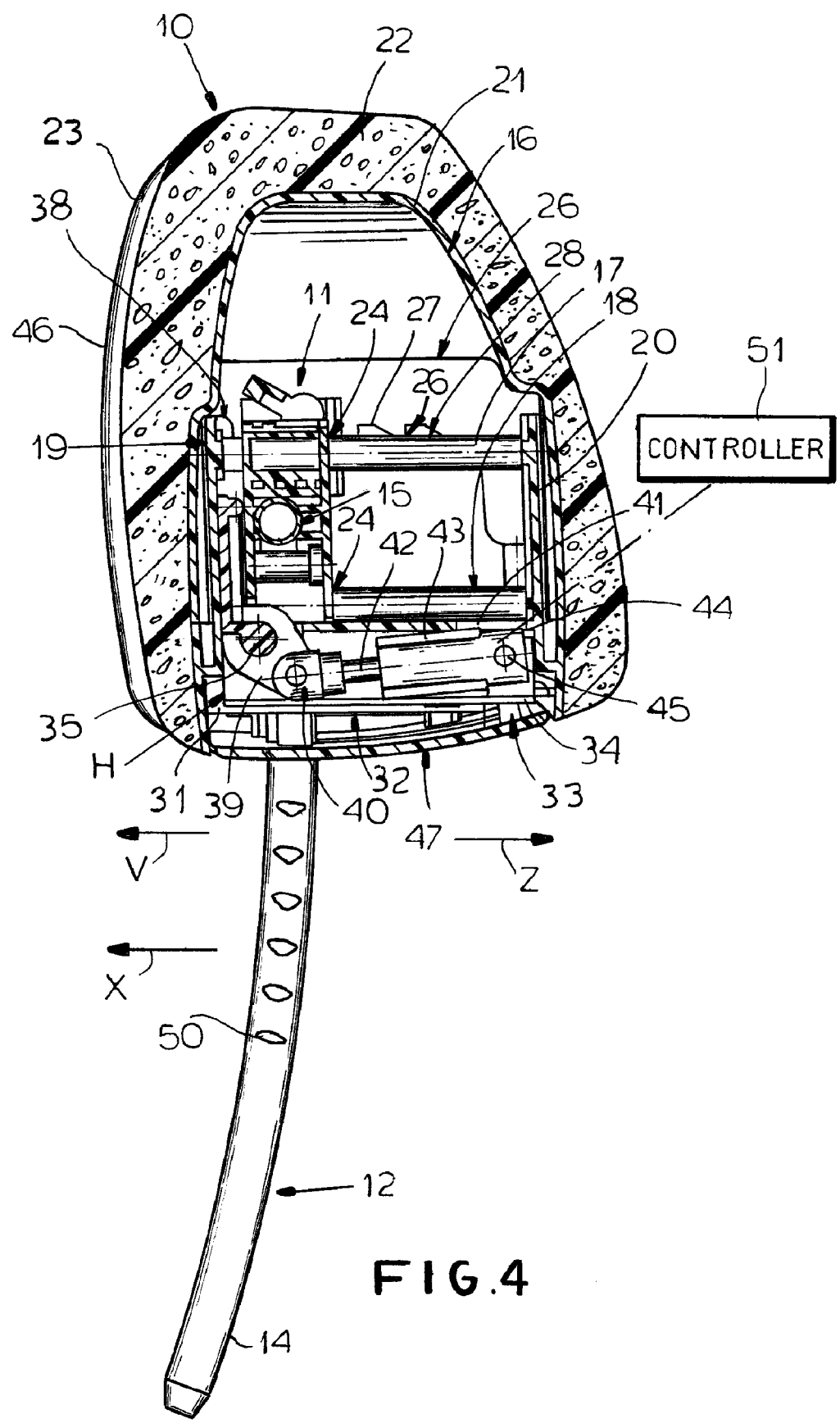
FIGS. 4 through 6 are vertical sections through the headrest in accordance with the invention in rear middle, and front positions.

As seen in the drawing, a headrest 10 according to the invention has a core support 11 mounted on a horizontal bight portion 15 of a downwardly open U-shaped rod 12 having legs 13 and 14 that are normally seated in the back of an unillustrated motor-vehicle seat. Sawtooth notches 50 on the confronting edges of the legs 13 and 14 allow the height of the headrest 10 above the seat back to be set in the standard manner. The core support 11 can be arranged to pivot limitedly about the horizontal axis of the bight 15.

Surrounding the support 11 is a hard shell 16 that has an upper guide rod 17 and two lower guide rods 18 that pass through respective holes 24 the support 11 and that allow the shell 16 to move forward in a forward direction v the same as a normal vehicle travel direction x and backward in an opposite rearward direction z. These support rods 17 and 18 extend parallel to each other and have front ends seated in an upright front wall 19 of the shell 16 and rear ends seated in an upright rear wall 20 thereof, with a top wall 21 interconnecting the walls 19 and 20. A cushion 22 fits over the shell 16 and has a fabric cover 23 normally matching the vehicle's decor and having a front face 46 engageable with the back of the head of a person sitting in the unillustrated seat.

Extending parallel to the rods 17 and 18 through the support 11 and unitary with the walls 19, 20, and 21 is at least one, here two, racks or toothed bars 25 having downwardly open sawtooth notches 28 each formed with a front rearwardly directed steep flank 26 and a rear forwardly directed shallow flank 27. A pawl 29 pivotal about a horizontal axis is spring-biased upward to engage in the notches 28 and normally block movement in the rearward direction z of the shell 16 and cushion 22. Movement in the opposite forward direction v (and x) is possible with the pawl 29 sliding over the shallow flanks 27 and moving from notch 28 to notch 28. Thus it is possible, when the pawl 29 is pressed upward against the racks 25, to slide the headrest 10 forward by simply gripping it and pulling it in the direction v, but rearward sliding in the direction z is blocked by engagement of the spring-loaded pawl 29 with the steep flanks 26.

Thus the normal function of the one-way latch formed by the pawl 29 and racks 25 is to allow the headrest 10 to slide forward in the directions v and x and to prevent it from sliding rearward in the direction z. A button 30 on the side of the headrest 10 can shift horizontally perpendicularly to the directions v, x, and z. As shown in FIGS. 7-11, this button 30 is connected to a control plate 48 connected via a link element 49 to the latch pawl 29. The plate 48 is upright and engages the element 49 in any position of the headrest 10. When the button 30 is pushed in, it pivots the pawl 29 down out of engagement with the racks 25 to allow rearward sliding on the headrest 10. Hence the user can shift the headrest 10 forward simply by pulling forward on it, but to shift it rearward must push it rearward while simultaneously depressing the button 30 to disable the latch formed by the racks 25 and pawl 29.

The shell 16 forms a lower cavity or space 31 holding a housing 32 of a replaceable crash-activated insert module 33 having a base plate 34. A cover plate 47 closes the space 31 to neatly contain the module 33. A two-arm lever H inside the housing 32 is carried on a pivot 35 fixed in the module 33 and defining a horizontal axis parallel to a front face 36 of the support 11. The lever H has a long spreader arm 37 extending from the pivot 35 and having an outer end 38 bearing rearward on the front face 36 and a short arm 39 also extending from the pivot 35 and having an outer end forming a pivot 40 connected to a piston rod 42 of a pneumatic piston-cylinder actuator 41, although a spring-loaded or electrically powered actuator is within the scope of the invention. In fact an electrically fired chemical system for generating the gas could be provided right in the actuator 41, wired to go off when the air bags deploy. A cylinder 43 of this actuator 41 has an outer end 44 pivoted at 45 on the module 33. Expansion of the actuator 41 will therefore pivot the lever H clockwise about the pivot 35 as shown in FIGS. 4-7 and thereby move the outer end 38 of the spreader arm 37 rearward in the direction z against the face 36. The axes defined by the pivots 35, 40, and 45 are parallel to each other and to the bight 15 and lie in respective upright planes perpendicular to the axes of the rods 17 and 18.

Figure 5:
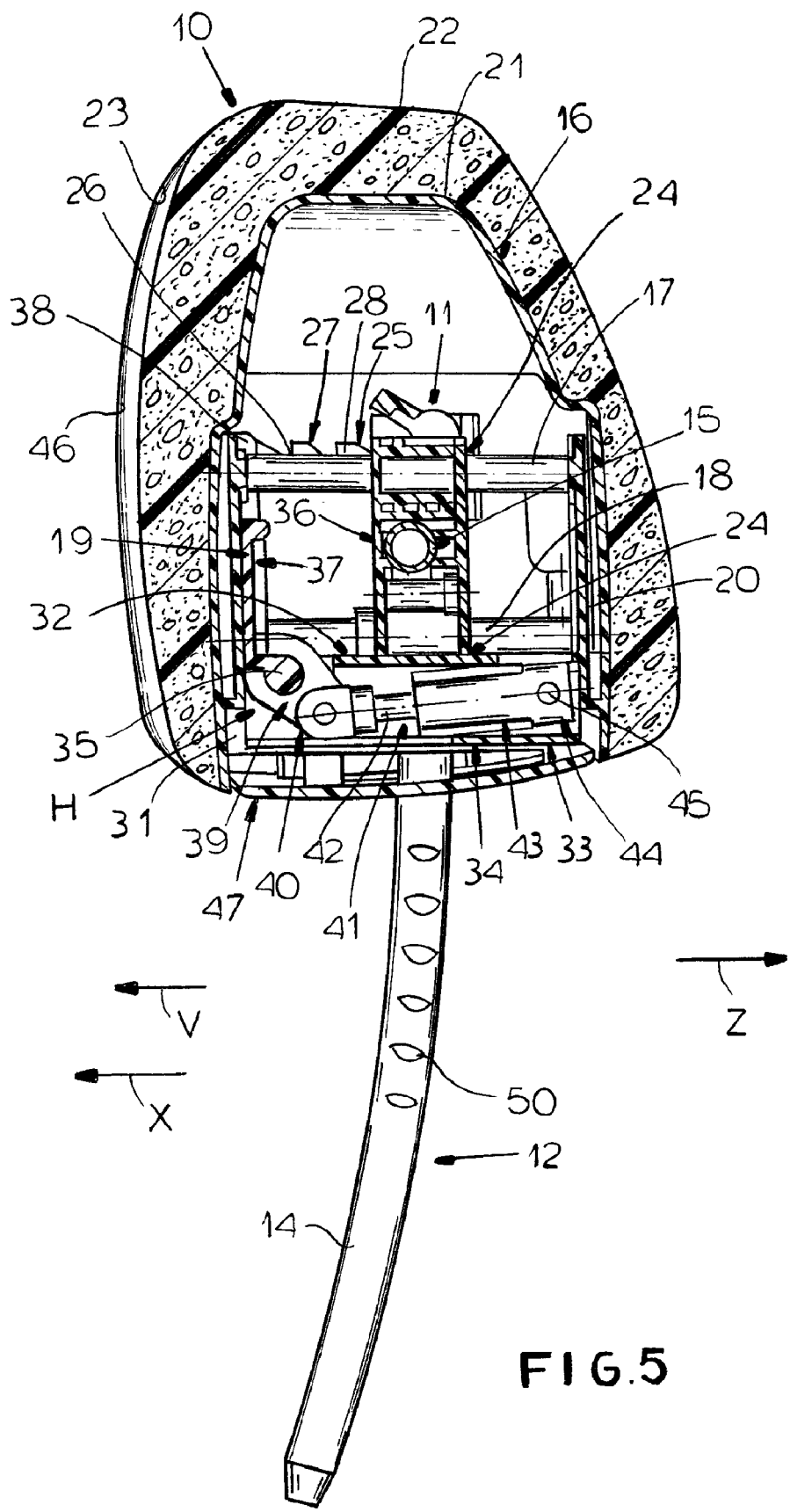
Figure 6:
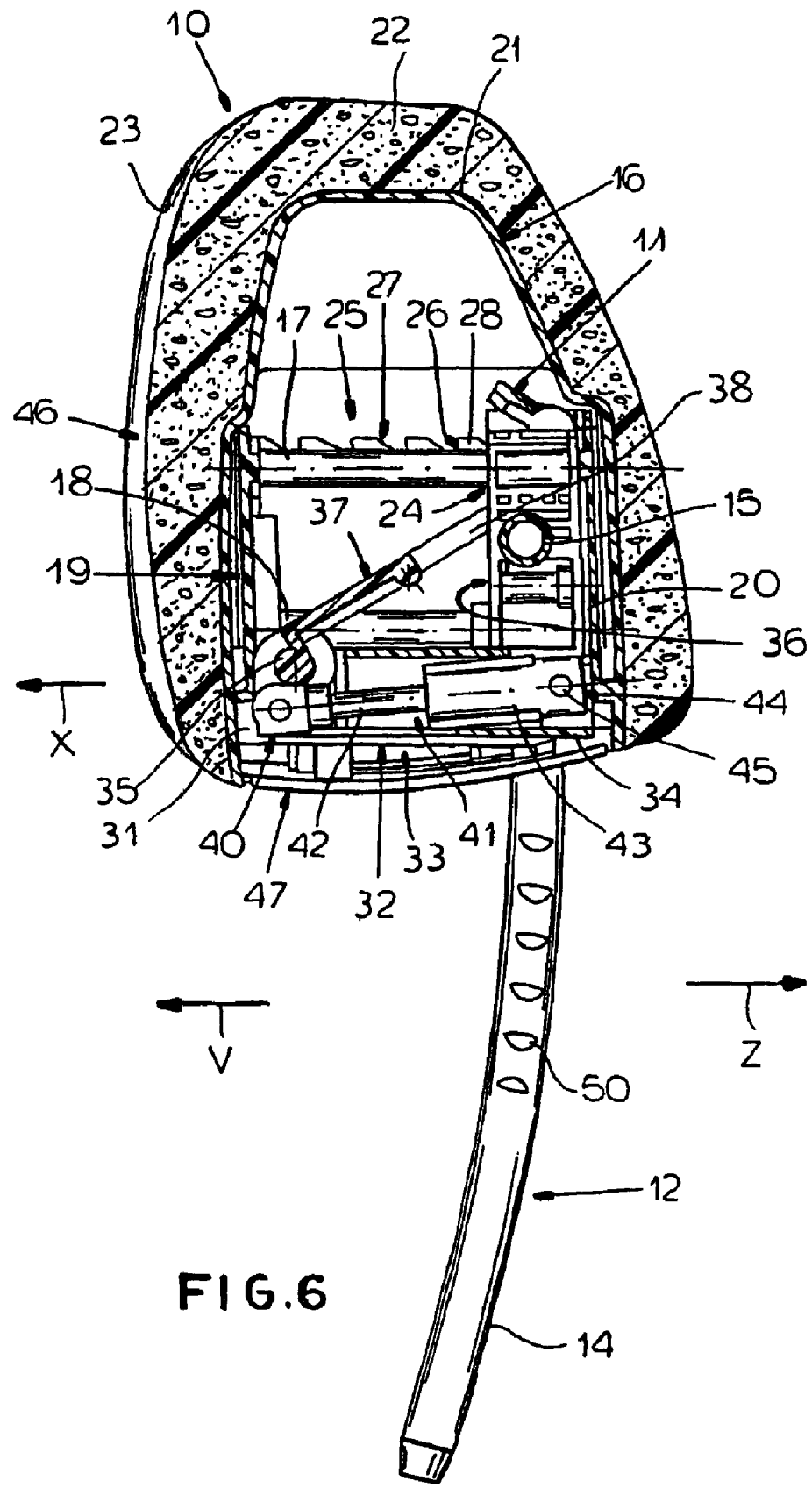
Figure 7:
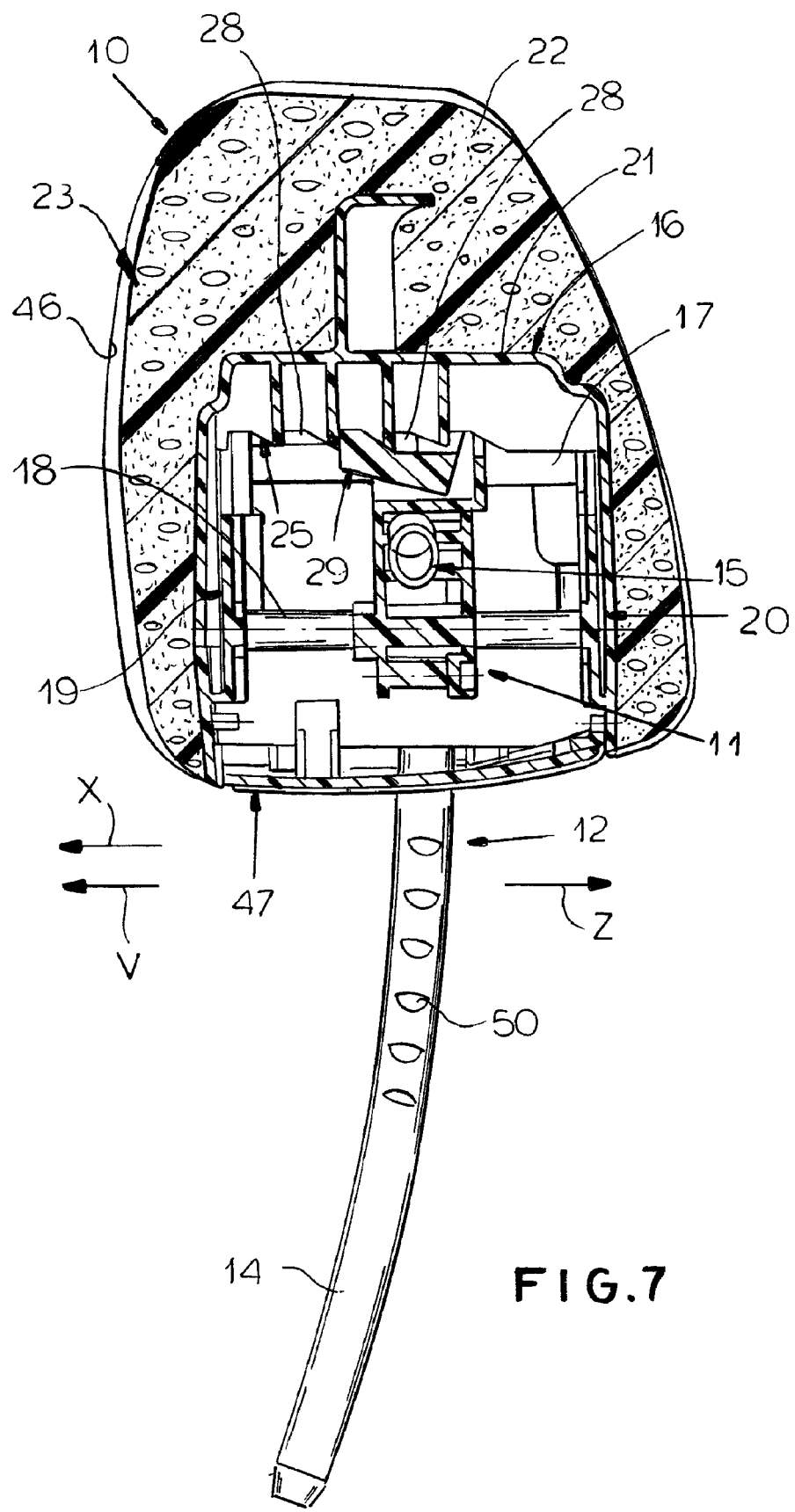
FIG. 7 is a vertical section showing the headrest in the middle position, but taken in a plane offset from that of FIG. 5.
Figure 8:
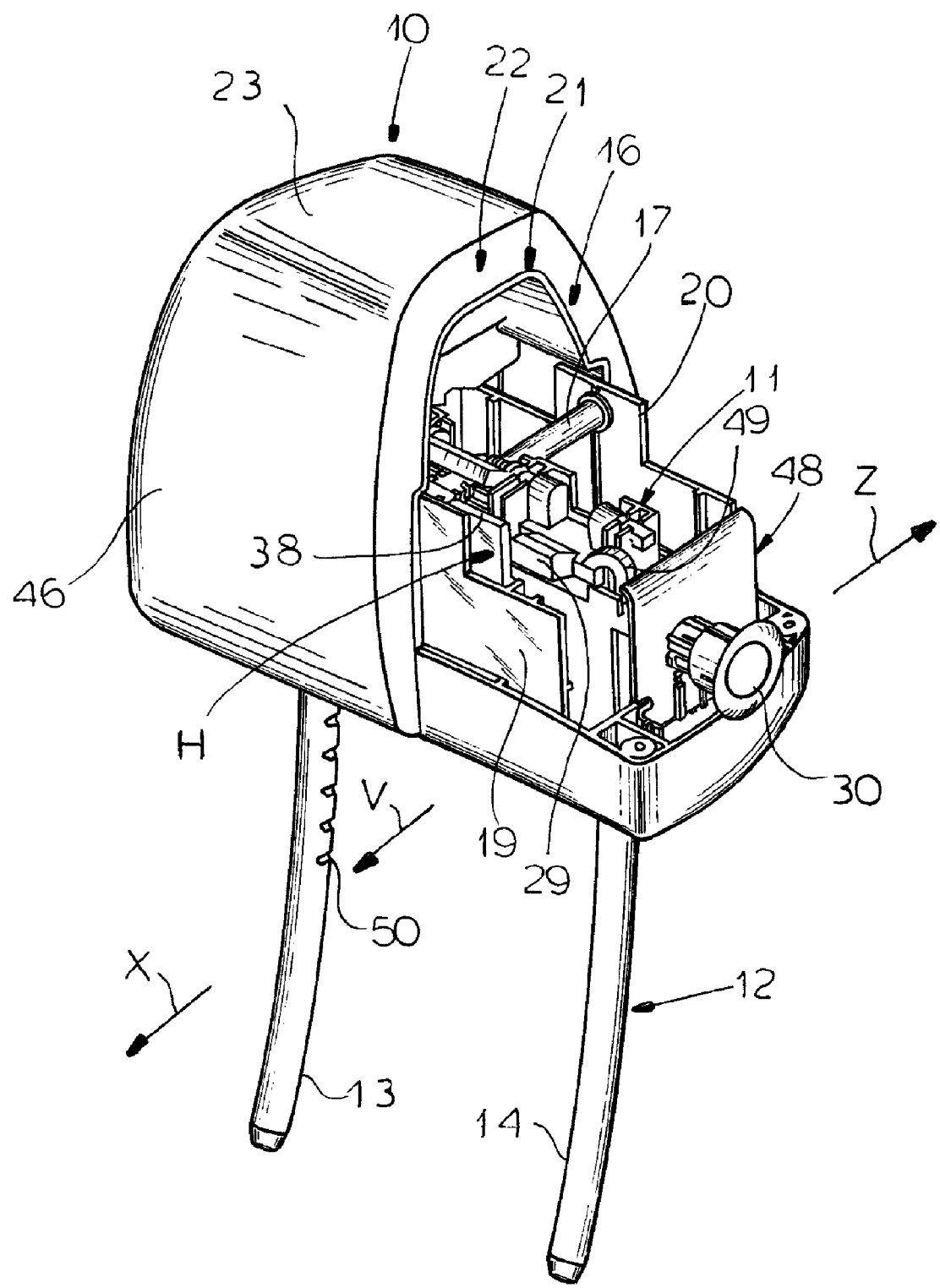
FIGS. 8 to 10 are perspective views with pieces removed for clarity of view showing the headrest in the rear, middle, and front positions.
Figure 9:
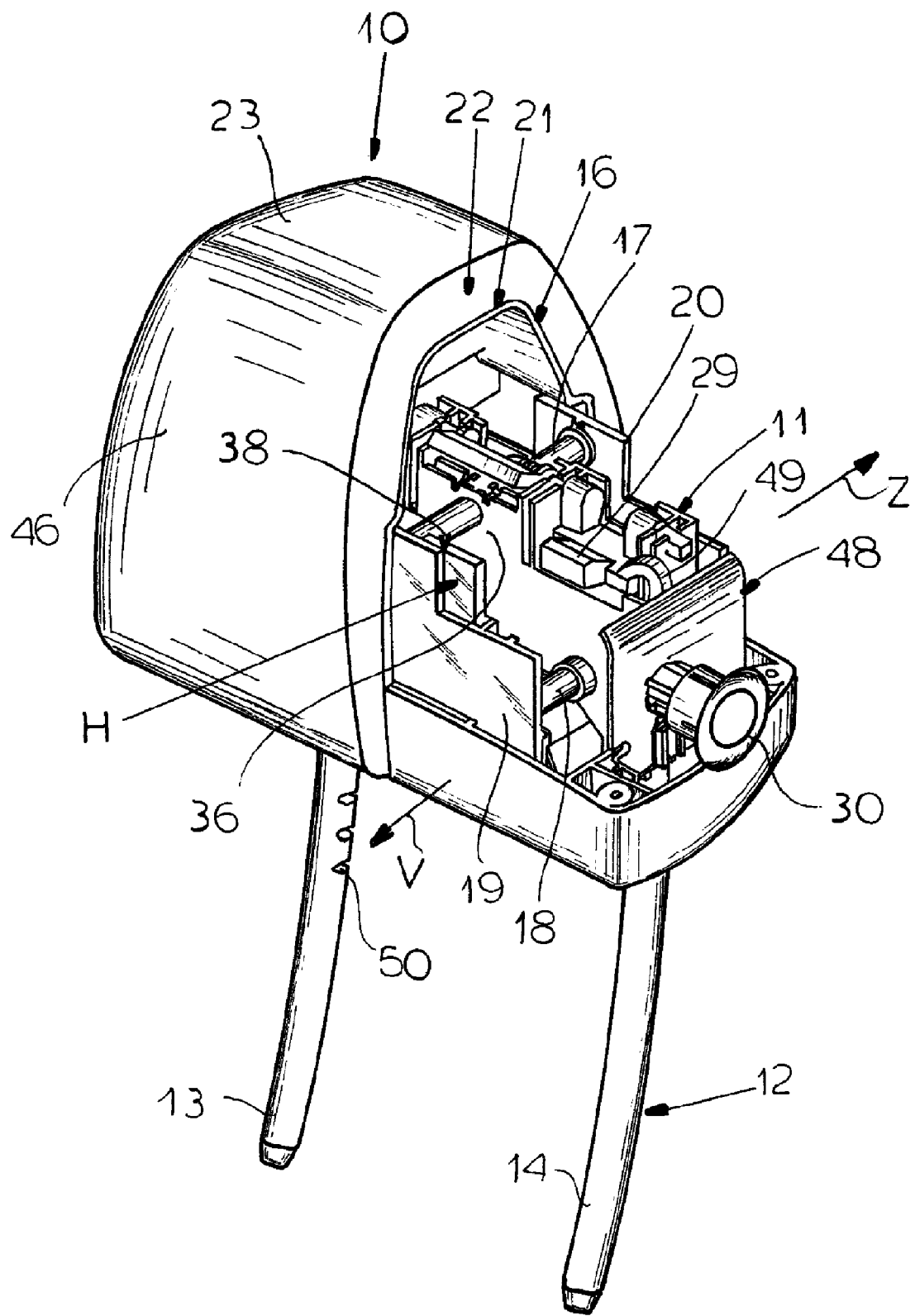
Figure 10:
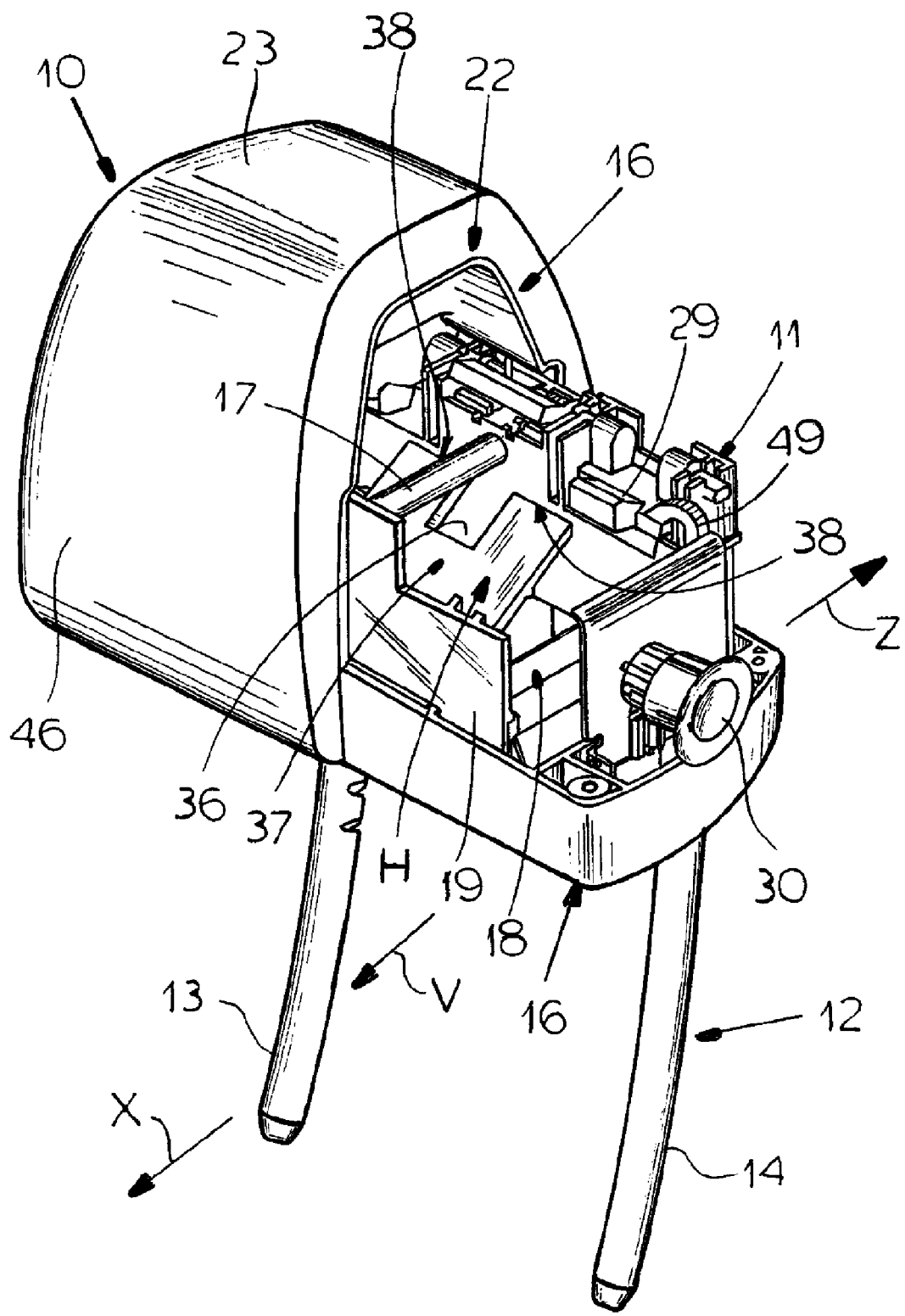
Figure 11:
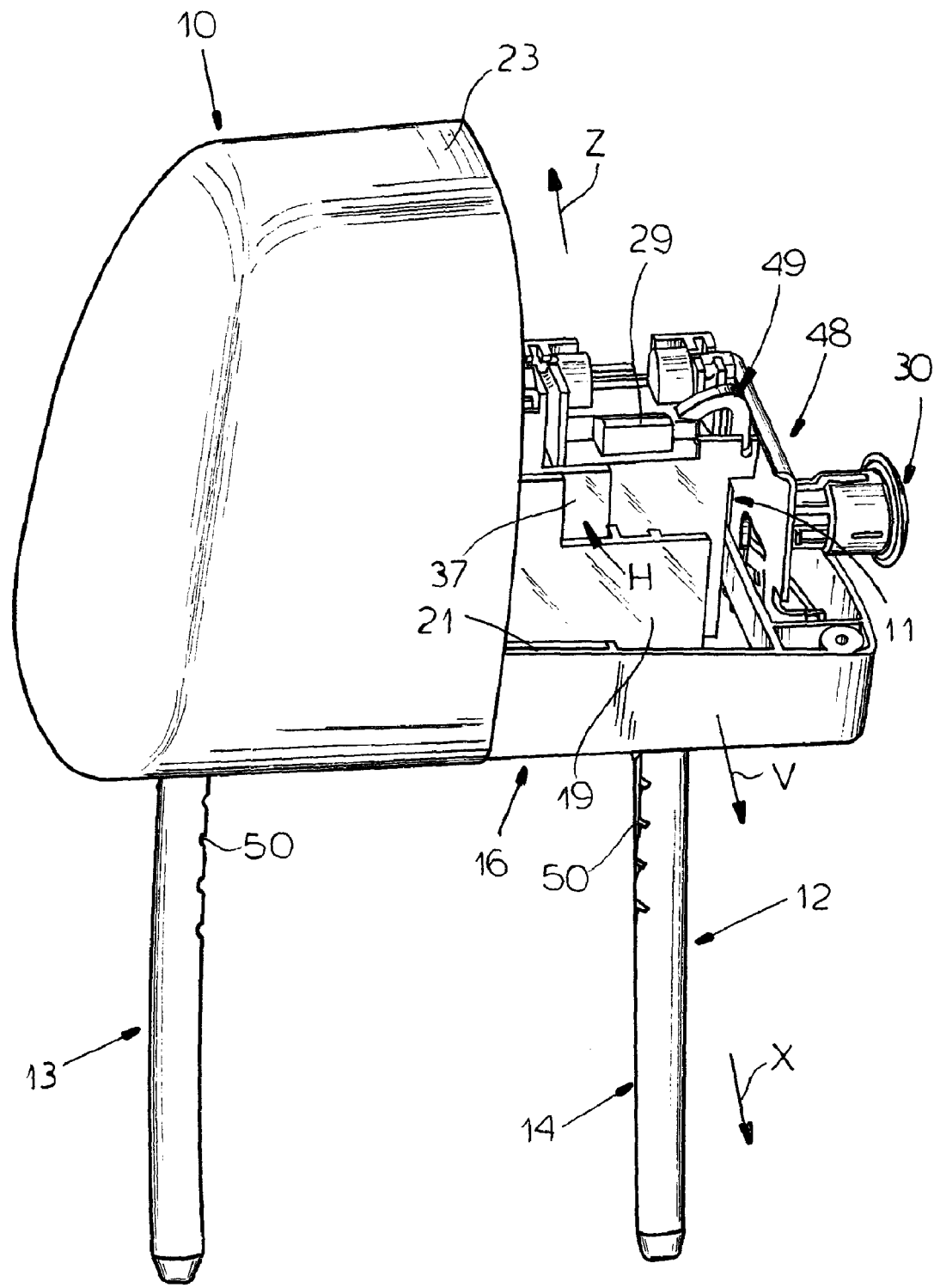
FIG. 11 is a front view with pieces removed for clarity of view and corresponding generally to FIG. 8.

According to the invention a controller 51 comprising a speed/acceleration detector and device for supplying or producing gas under pressure is connected to the cylinder 43, or can even be provided inside the module 33. In a collision, that is a sudden extreme deceleration when traveling in the forward directions v and x, the cylinder 43 is pressurized. Starting from the position of FIGS. 2 and 8, this action causes the lever H to pivot clockwise as shown in FIGS. 4-6 to push the lever end 38 against the face 36 and shift the headrest 10 from the rear position of FIGS. 4 and 8 or the middle position of FIGS. 5 and 7 to the front position of FIGS. 6 and 9. The pawl 29 meanwhile will ratchet in the notches 28 as the headrest 10 moves forward. The result is significant whiplash protection for the occupant of a vehicle during a collision, as once moved forward, the pawl 29 will lock the headrest 10 and prevent it from moving backward. In the front position, the long arm 37 of the lever H is almost horizontal so that it is solidly braced against the support 11, providing good rearward bracing for the seat's occupant.

After such crash actuation, the headrest 10 can be shifted rearward by pressing in the button 30, as in a normal adjustment operation. The module 33, if it incorporates the sensor and pressure-generating system, can be replace easily by removing the cover 47 and putting a refitted unit in.

I claim:
1. A vehicle headrest comprising:
   a vehicle-mounted support having a flat upright support face;
   a cushion;
   guides mounting the cushion on the support for displacement forward from a rear position in a vehicle travel direction to a front position and rearward opposite to the travel direction from the front position to the rear position;
   a lever pivoted in the cushion at a horizontal pivot axis generally parallel to the support face and fixed in the cushion, the lever having a first arm having an outer end rearwardly engageable with, bearing on, but not coupled to the support and a second arm extending at an angle of less than 180° to the first arm and having an outer end; and
   a piston-cylinder unit having one end pivoted on the cushion and an opposite end pivoted on the outer end of the second arm of the lever, the unit being expansible for pivoting the lever, pressing the first arm outer end rearwardly against the support, and displacing the cushion forward into the front position with sliding of the first arm outer end on the support face.

2. The vehicle headrest defined in claim 1 wherein the second arm is shorter than the first arm.

3. The vehicle headrest defined in claim 1 wherein the ends of the piston-cylinder unit are pivoted at axes substantially parallel to a front face of the support and transverse to the travel direction.

4. The vehicle headrest defined in claim 1 wherein the piston-cylinder unit has a piston rod pivoted on the second arm outer end and a cylinder pivoted on the cushion.

5. The vehicle headrest defined in claim 1 wherein the piston-cylinder unit is fluid powered.

6. The vehicle headrest defined in claim 1 wherein the piston-cylinder unit is gas powered.

7. The vehicle headrest defined in claim 1, further comprising
a rod adapted to be fixed in a vehicle seat back and carrying the support.

8. The vehicle headrest defined in claim 7 wherein the piston-cylinder unit is at least partially held in the rod.

9. The vehicle headrest defined in claim 1, further comprising
control means including a crash sensor responsive to sudden deceleration for operating the piston-cylinder unit.

10. The vehicle headrest defined in claim 1, further comprising
a removable insert module held in the cushion and carrying the piston-cylinder unit and the lever.

11. The vehicle headrest defined in claim 10 wherein the cushion is formed with an outwardly open cavity complementarily receiving the insert module, the cushion including a plate fitting over the cavity and holding the insert module therein.

12. The vehicle headrest defined in claim 11 wherein the cavity is downwardly open.

13. The vehicle headrest defined in claim 1, further comprising
latch means connected between the cushion and the support latchable for preventing movement of the cushion opposite to the travel direction.

14. The vehicle headrest defined in claim 13 wherein the latch means includes a toothed element extending in the travel direction and a pawl capable of ratcheting along the toothed element.

15. The vehicle headrest defined in claim 14 wherein the toothed element is a rack formed with sawtooth notches and fixed on the cushion and the pawl is pivotal and mounted on the support.

16. The vehicle headrest defined in claim 15 wherein the latch means includes an externally accessible element operable to disengage the pawl from the rack.

17. The vehicle headrest defined in claim 1 wherein the guides constrain the cushion for straight-line horizontal movement relative to the support.

18. The vehicle headrest defined in claim 17 wherein the guide includes at least one horizontally extending rod.

* * * * *